March 19, 1940.                S. STROBL                    2,193,890
                              COLLET CHUCK
                           Filed Oct. 18, 1937              2 Sheets-Sheet 1

Inventor
                                              S. Strobl
                                  By          H. J. Sanders
                                                    Atty.

March 19, 1940.  S. STROBL  2,193,890
COLLET CHUCK
Filed Oct. 18, 1937  2 Sheets-Sheet 2
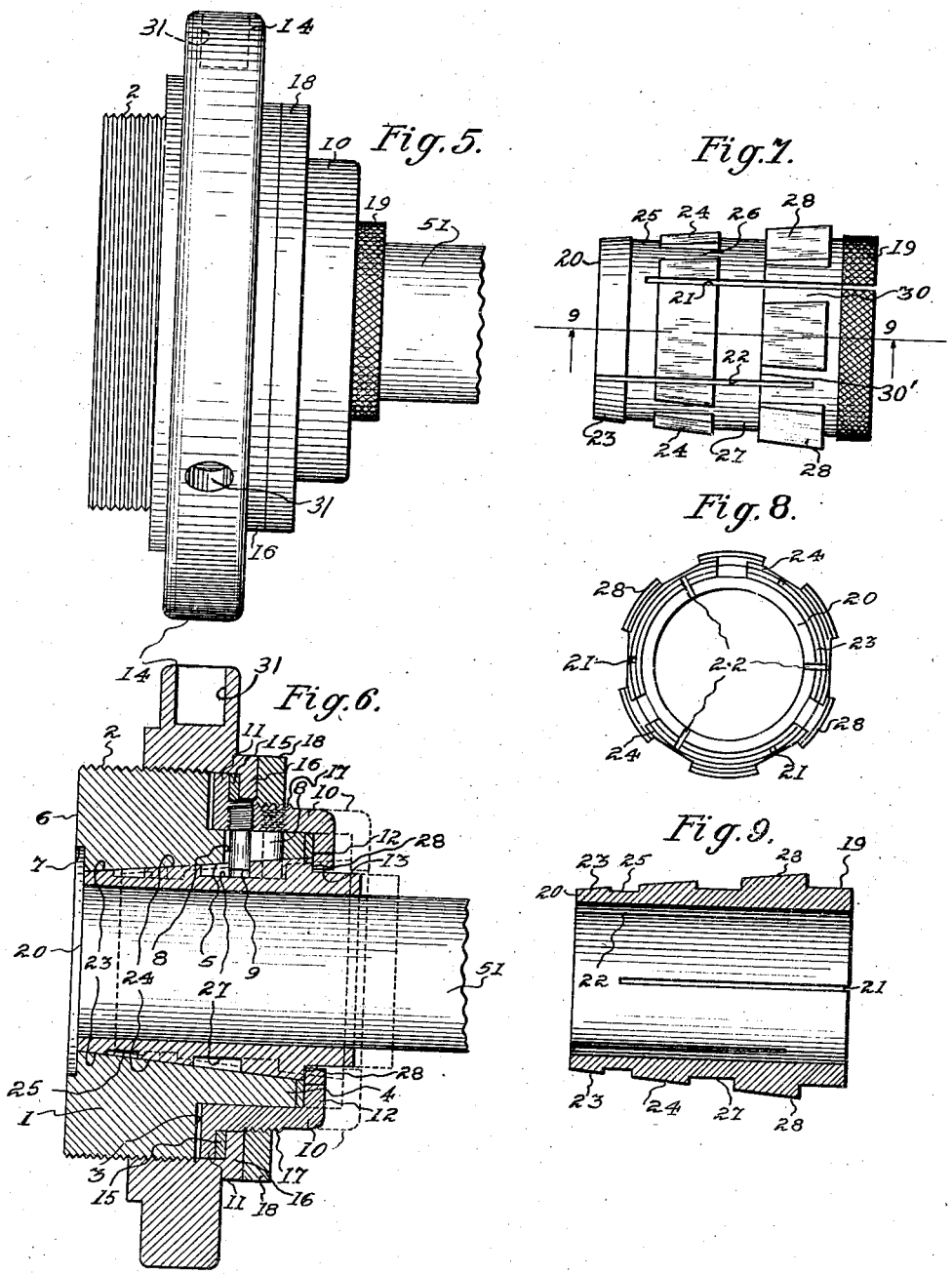
Inventor
S. Strobl
H. J. Sanders
Atty
By Patented Mar. 19, 1940

2,193,890

UNITED STATES PATENT OFFICE 2,193,890

COLLET CHUCK

Samuel Strobl, Chicago, Ill.

Application October 18, 1937, Serial No. 169,723

3 Claims. (Cl. 279—51)

This invention relates to chucks, and more particularly to collet chucks for use in connection with lathes or metal-cutting machines wherein either the work or the tool is gripped and rotated by the chuck. One object is to provide an improved collet chuck that is so mounted as to permit instantaneous change of collets when desired, the collet being releasably retained in a holder without the use of screw threads and having a hand wheel effecting movement of pins engageable by the collet and which pins serve to release the collet upon movement of the hand wheel so that the collet may be manually oscillated and withdrawn and another instantly inserted and oscillated into operative position whereby it may be locked in position by rotation of the hand wheel. This makes it very easy to clean the chuck, repair or service the same.

A further object is to provide a collet chuck wherein the collet diameter may be readily reduced along its entire length to accommodate work of smaller diameter. A still further object is to provide a chucking device of the collet type that will quickly and positively grip rods and cylindrical parts parallel to their surface the entire length of the collet and retain them concentric with the axis of the lathe or machine spindle to which the chuck is mounted with a greater degree of precision than possible with collets of conventional type.

A still further object is to provide a collet chuck of few parts, all parts being readily accessible and easily cleaned, that is positive and efficient in operation, durable in use and inexpensive to manufacture.

With the foregoing and other objects in view the invention consists in the combination and arrangement of parts to be hereinafter fully described, pointed out in the claims and illustrated in the accompanying drawings which form a part of this application for patent and in which:

Fig. 5 is a side view of the collet chuck in elevation, holding the work.

Fig. 6 is a vertical cross sectional view through the device taken on the line 6—6 of Fig. 1.

Fig. 7 is a side view of the collet in elevation.

Fig. 8 is an end view of Fig. 7.

Fig. 9 is a longitudinal sectional view through Fig. 7 on the line 9—9 thereof.

Like reference characters denote corresponding parts throughout the several views.

Figure 1:
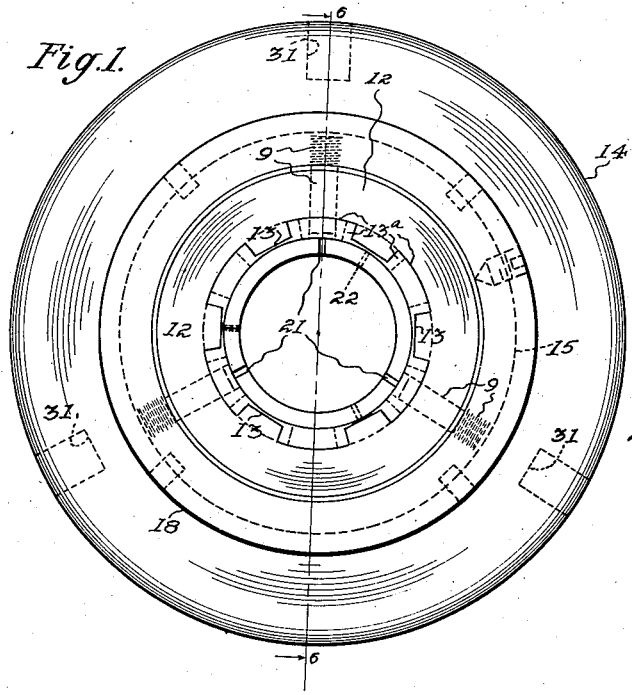
Fig. 1 is a face view of the collet chuck in elevation.
Figure 3:
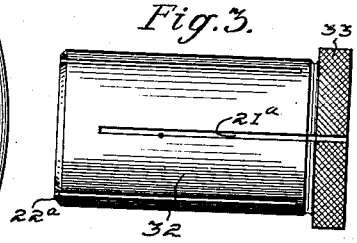
Fig. 3 is a view in side elevation of a reducing bushing sometimes employed.
Figure 4:
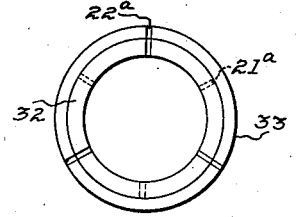
Fig. 4 is an end view of Fig. 3.
Figure 2:
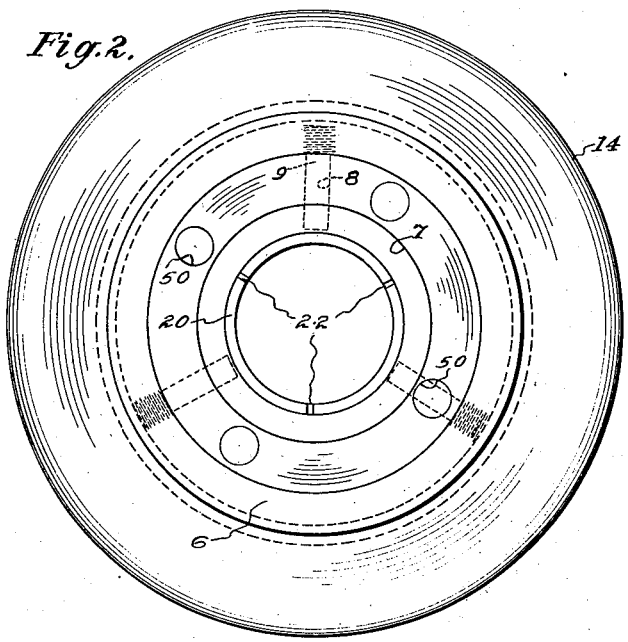
Fig. 2 is a view similar to Fig. 1 but showing the opposite face thereto.

The reference numeral 1 denotes the cylindrical body portion of the chuck having the peripherally threaded portion 2 terminated by the shoulder 3 formed by the reduced body portion 4, the body being formed with the axial bore 5 slightly tapered outwardly from the body face 6 through the reduced portion 4, said face 6 being formed immediately about the smaller end of the tapered bore with the annular slightly recessed portion 7. Opening through the reduced body portion in uniform spaced relation to the threaded body portion are the elongated slots 8, which extend longitudinally of the tapered bore 5 and being three in number, through which the pins 9 extend and which pins are each provided with a threaded end disposed in threaded sockets formed in the hub-shaped retainer 10 that snugly receives the reduced chuck-body portion 4 and is movable or adjustable with respect thereto, a slight play or oscillatory movement thereof and a relatively great movement longitudinally thereof being permitted by the said pins in the slots 8.

The retainer 10, round in cross section carries the pins 9 radially and is concentric with the chuck body and is formed about its inner edge with the outwardly disposed flange 11 normally in contiguity to the shoulder 3 of the threaded body portion, and about its outer edge with the inwardly bent flange 12 in spaced relation with the end of the reduced body portion 4, said flange 12 being formed peripherally with the spaced lugs 13 of a common size and shape and the spaces 13a between the lugs being uniform, the lugs projecting inwardly beyond the plane of the reduced portion 4 of the chuck body 1. Each pin 9 is in line with one of the spaces 13a between lugs 13.

Engaging with the threaded portion 2 of the chuck body are the internal threads of the operating hand wheel 14 movable longitudinally of said chuck body, said hand wheel being removable from engagement with the said body portion and when in its operative position extending laterally beyond the shoulder 3, the hand wheel is provided with an integral inwardly extending flange 16 which retains a spacer ring 15 against the retainer flange 11. The hub-shaped retainer 10 is provided with a peripherally threaded portion 17 to which a threaded anchor ring 18 is secured and which ring retains the retainer 10 for longitudinal adjustments with the hand wheel while permitting of a free rotary movement of the hand wheel.

In Fig. 7 is shown a substantially cylindrical collet which is tapered slightly from its knurled end 19 to its end 20 and formed with three slots 21 extending longitudinally from its knurled end to a point a short distance from its end 20, and with three slots 22 extending from its end 20 almost to the knurled end 19, said slots being alternately disposed about the collet, thus providing the necessary collet resiliency its entire length and forming the collet jaws. In assembly the collet is concentric with the body and retainer.

While the body wall proper of the collet is truly tapered slightly from its knurl 19 to its end 20 the latter is formed with a slight annular rib or thickened portion 23 and spaced therefrom with three bosses 24 separated therefrom by the wall portion 25, said bosses being separated from each other by the wall portions 26 which connect the wall portion 25 with a similar but wider parallel wall portion 27 between which and the knurled portion 19 a plurality, six in number, of spaced bosses 28 are formed peripherally of the collet; wall portions 30 separating said bosses from each other and being slightly raised at 30' and alternate bosses 28 being disposed in line with the wall portions 26.

To introduce the collet into the reduced portion 4 of the body 1 and retainer 10 the operating hand wheel is rotated in one direction, into its dotted position shown in Fig. 6, to provide clearance within the body, the collet is introduced, reduced end first. The pins 9 of the retainer passing through the elongated slots 8 permit sufficient longitudinal movement of the retainer to admit the collet. The retainer is held in this dotted outward position as the collet is introduced by hand in such manner that the three wall portions 26, extending longitudinally of the collet, are in line with the three pins 9 which pass therethrough and into the annular wall portion 27. The bosses 24 will readily pass the lugs 13 of the retainer flange 11 and the bosses 28 will pass between those lugs until they are disposed wholly clear of the same within the portion 4 of the body 1. The collet is now manually oscillated, as denoted by the dotted lines in Fig. 1, to place the bosses 28 in line with the lugs 13 and below the same. The chuck is now applied to the lathe spindle, an adapter being used in a well known manner, the bolts thereof being received in the four threaded sockets 50 in the body 1 so that the chuck is concentric with the lathe spindle. The work 51 is now introduced into the collet and the operating hand wheel rotated by a tool applied to the sockets 31 therein thus causing the flange 16 to urge the gasket 15 against the retainer flange 11 and the flange 12 against the bosses 28 of the collet, the pins 9 being spaced from the collet wall; the interior wall of the body portion 4 bearing against the collet bosses 24, 28 and rib 23, as shown in Fig. 6, thus forcing the collet jaws into most positive frictional engagement with the work, this binding action increasing as the collet is moved further into the chuck body. To accommodate work of a smaller diameter without using a smaller collet a reducing bushing 32 is employed. It is of cylindrical construction and provided with longitudinally extending slots 21a, 22a similar to the slots 21, 22 of the collet, the bushing being formed with a slightly enlarged knurled head 33 by means of which it is grasped, the smaller end of the bushing being introduced into the collet and the work received in the bushing. The chuck is then tightened in the manner previously described. To remove the collet the wheel 14 is rotated to the left causing the pins 9 to engage the raised portions 30' or lugs 28 and positively force the collet outwardly. As the taper of the collet is very gradual it grasps the work very firmly and being positively forced into the chuck by the hand wheel it may at times be difficult to eject. To fully take care of this, however, and to facilitate such ejection the positive engagement of the pins 9 with the wall portions 30' or lugs 28 is effective, the pins 9 being positively actuated by the rotation of the hand wheel.

When the collet is freed from frictional engagement with the chuck it may be manually oscillated to position the wall portions 26 in line with the pins 9 and the collet may be instantly withdrawn by hand and another collet manually inserted without in any way disturbing any part of the assembly. This is a very important feature in a collet chuck of this type.

The invention is presented as including all such modifications and changes as properly fall within the scope of the appended claims.

What is claimed is:

1. In a collet chuck, a body portion having a tapered bore and radial apertures, a retainer including a hand wheel concentric therewith and adjustable longitudinally thereof, a collet adjustably disposed within said retainer and body portion and concentric with said members, said collet having a plurality of tapered bosses thereon corresponding to the tapered bore of the body, means on the retainer for positive engagement with and for forcing the collet into the bore of the body portion upon one direction of movement of the hand wheel, and pins extending through said apertures and carried by said retainer adapted for positive engagement with the bosses of said collet for removing the same upon the other direction of movement of the hand wheel.

2. In a collet chuck having a hollow body portion provided with radially disposed open slots, a retainer concentric with the body portion and adjustable longitudinally thereof, pins carried by said retainer and extending inwardly through the slots of the body portion, a collet adjustably disposed within said retainer and body portion and concentric with said members, said collet having a series of annular bosses on its periphery and arranged when positioned in the chuck with the bosses engageable by the retainer in one direction of movement of the retainer and engageable by the pins in the other direction of movement of the retainer.

3. In a collet chuck having a hollow body portion provided with a plurality of open slots disposed radially of the body portion, a retainer concentric therewith for longitudinal adjustments thereon, a hand wheel threaded on said body for actuating said retainer, pins carried by said retainer and extending through the open slots in the body portion, a collet adjustably disposed within said retainer and body portion and concentric with said members, said collet having a plurality of bosses between which the pins extend when inserting the collet, the collet being manually rotatable for positioning the pins in alignment with the bosses, said collet being engaged by the retainer during the movement in one direction of the retainer on the body portion, the pins engaging the bosses to remove the collet upon the opposite movement of the retainer on the body portion.

SAMUEL STROBL.